United States Patent [19]

Taniguchi et al.

[11] Patent Number: 4,996,890
[45] Date of Patent: Mar. 5, 1991

[54] TORQUE SENSOR

[75] Inventors: Manabu Taniguchi; Hidenobu Nagano; Masayuki Watanabe, all of Osaka, Japan

[73] Assignee: Koyo Seiko Co. Ltd., Osaka, Japan

[21] Appl. No.: 417,364

[22] Filed: Oct. 5, 1989

[30] Foreign Application Priority Data

| Oct. 7, 1988 | [JP] | Japan | 63-254589 |
| Oct. 14, 1988 | [JP] | Japan | 63-134773 |
| Dec. 27, 1988 | [JP] | Japan | 63-169335 |
| Dec. 27, 1988 | [JP] | Japan | 63-169336 |

[51] Int. Cl.$^5$ .............................................. G01L 3/10
[52] U.S. Cl. .............................................. 73/862.33
[58] Field of Search ............... 73/862.33; 324/207.25, 324/207.22, 207.12

[56] References Cited

U.S. PATENT DOCUMENTS 2,470,626  5/1949  Langer et al.
2,498,282  2/1950  Langer.
4,356,732  11/1982  Hachtel et al.
4,522,278  6/1985  Kitagawa et al.

FOREIGN PATENT DOCUMENTS 3344385  6/1985  Fed. Rep. of Germany.
3532351  3/1987  Fed. Rep. of Germany.
59-46526  3/1984  Japan.
0532022  10/1976  U.S.S.R.
0564147  7/1977  U.S.S.R.

Primary Examiner—Charles A. Ruehl
Attorney, Agent, or Firm—Townsend and Townsend

[57] ABSTRACT

A torque sensor according to this invention is so constructed that a plurality of magnetic cylinders mounted respectively to two shafts coupled via a torsion bar are able to be electromagnetically coupled variably to each other in accordance with the relative rotation of the two shafts, and the electromagnetic coupling state of a plurality of cylinders mounted to these two shafts is detected by the electromagnetic coupling detection coils. Components with elastic properties are used in the construction of the sensor so as to absorb the rattlings and thereby reduce the noise previously associated with these devices.

9 Claims, 20 Drawing Sheets

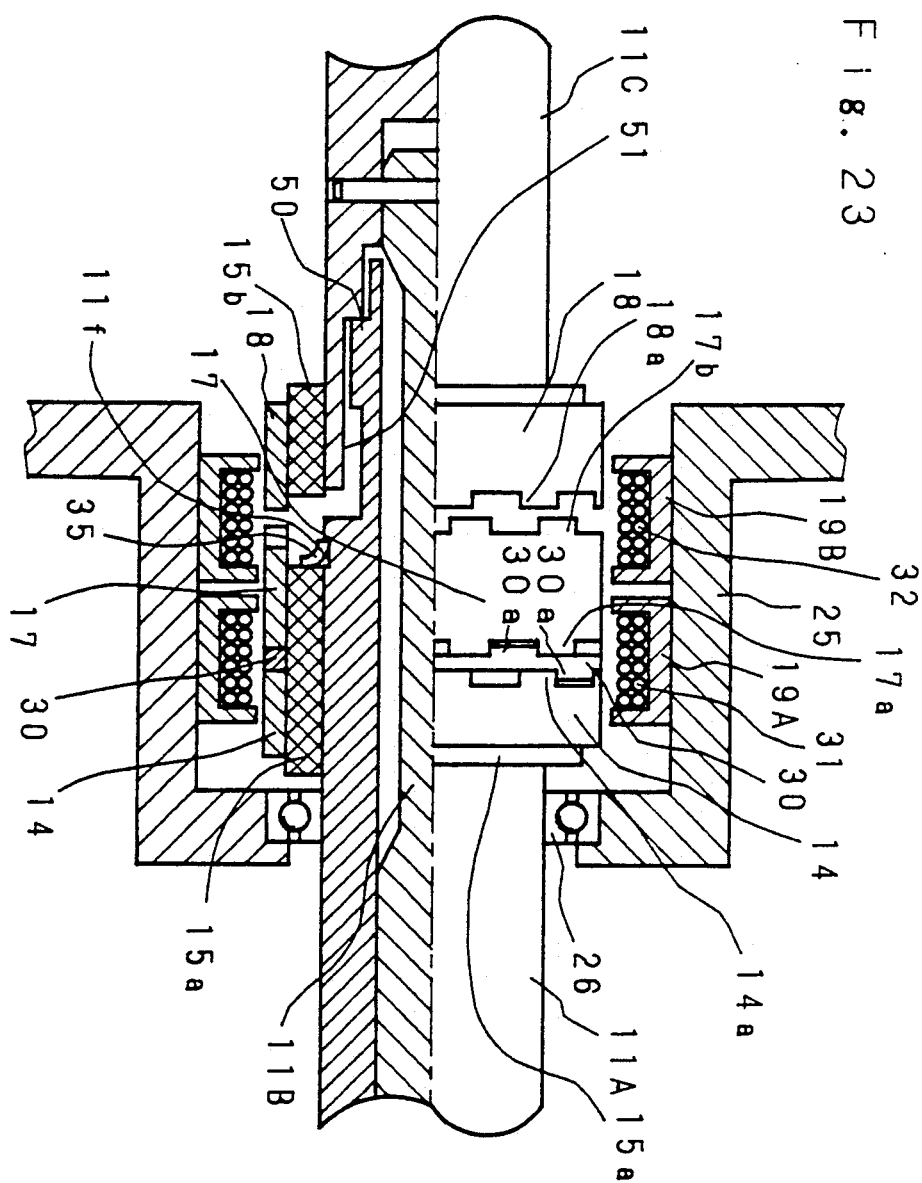

TORQUE SENSOR

BACKGROUND OF THE INVENTION

1. Field of the Invention

The present invention generally relates to a torque sensor adapted to detect torque acting on a shaft. More particularly, the invention is related to a torque sensor suitable for application on an electric motor-driven power steering arrangement of an automobile.

2. Description of Related Art

Electro motor-driven power steering systems have been developed in recent years to help assist in the steering of an automobile. The power steering arrangement referred to above requires an electric motor mounted to a steering system which is rotated in accordance with the detected torque applied to the steering wheel.

Torque sensors detecting the torque applied to the steering wheel as shown in FIGS. 1 and 2, have been proposed by the inventors of the present invention and others (Japanese Utility Model Application No. 63-54841) (54841/1988). FIG. 1 is a half cross sectional view of the prior art torque sensor wherein an upper shaft 11A connected to the steering wheel is coaxially coupled to a lower shaft 11C connected to the steering system, via a torsion bar 11B. The upper shaft 11A is rotatably supported by a cylindrical casing 25 secured to the automobile body (not shown) via a bearing 26. A first sleeve 15b made of a non-magnetic material is securely fitted on the outer periphery of the upper end (right side in the drawing) of the lower shaft 11C, with a first cylinder 18 made of a magnetic material being securely fixed to the outer periphery thereof.

One end face at the side of the lower shaft 11C of the first cylinder 18 is a flat surface perpendicular to the center of the lower shaft 11C. The other end face at the side of the upper shaft 11A of the first cylinder 18 has many rectangular toothed parts 18a, 18a, . . . is perpendicular to the center of the lower shaft 11C.

Similarly, a second sleeve 15a made of a non-magnetic material is securely fitted on the outer periphery of the lower end (left side in the drawing) of the upper shaft 11A, and second and third cylinders 17 and 14 made of magnetic material is fixed on the outer periphery thereof. Further, a gap forming member 10, which is ring-shaped and of narrow width made of non-magnetic material such as brass, aluminum, austenite stainless steel or the like is intervened between the second and third cylinders 17 and 14, and exteriorly fitted on the outer periphery of the second sleeve 15a.

The third cylinder 14 has the same configuration as that of the first cylinder 18, and is mounted to the reverse direction of the first cylinder 18.

The opposite end face of the second cylinder 17 has toothed parts 17a, 17a . . . and 17b, 17b . . . formed in the same configuration and with the same pitch as the aforementioned toothed parts 18a, 18a, . . . . Each of the toothed parts 17a, 17b is met on the same line parallel to the center of the cylinder 17. Moreover, the cylinders 18 and 17 are so positioned in the rotational direction thereof that the toothed parts 18a and 17b confront each other at the position half the tooth width when no torque acts on the torsion bar 11B. The toothed parts 17b, 17b . . . of the second cylinder 17 are spaced at an appropriate distance from the toothed parts 18a, 18a . . . of the first cylinder 18.

The cylinders 17 and 14 are positioned so that the toothed parts 17a and 14a confront each other at the position half the tooth width thereof, in the similar manner as the toothed parts 17b and 18a, when no torque acts on the torsion bar 11B.

There is a stopper 50 in the form of the narrow strip projecting parallel to the center of the upper shaft 11A on the outer peripheral surface at the lower end of the shaft 11A. At the upper end of the lower shaft 11C, a stopper guide groove 51 is notched with an appropriate length in the peripheral direction of the inner peripheral surface of an opening formed concentrically with the center of the lower shaft 11C. The above stopper 50 is engaged into the stopper guide groove 51. The arc length of the stopper guide groove 51 are set so that the upper and lower shafts 11A and 11C are able to rotate relatively, for example, by approximately half the tooth width of the toothed part 17b.

Inside the casing 25 are securely fitted cylindrical members 19A and 19B made of magnetic material which respectively form peripheral grooves. The cylindrical member 19A faces the confronting part of the second and third cylinders 17 and 14, and the cylindrical member 19B faces the confronting part of the first and second cylinders 18 and 17. A first electromagnetic coupling detection coil 32 and a second electromagnetic coupling detection coil 31 are wound around in the peripheral grooves of the cylindrical members 19B and 19A, respectively, so that the cylinders 18 and 17 are electromagnetically coupled to each other by the first electromagnetic coupling detection coil 32, while the cylinders 17 and 14 are electromagnetically coupled to each other by the second electromagnetic coupling detection coil 31.

In the prior art torque sensor mentioned above, since the first, second and third cylinders 18, 17 and 14 as well as the cylindrical members 19A and 19B are fixed respectively as described hereinabove, the positioning accuracy of these cylinders in the axial direction depends on the accuracy of the size of each component thereof. Therefore, if the sizing accuracy is poor, the cylinders 18, 17 and 14 burdened with an increase in the pressing-in load in the radial direction thereof, resulting in an increase of the stress. Moreover, in such a case as above, the cylindrical members 19A and 19B rattle in the axial direction, bringing about a problem such that an abnormal output may occur because of the increase in the stress due to the temperature change or the vibrations caused by the rattling.

Moreover, although the toothed parts 17a, 17b are provided at the opposite end faces of the second cylinder 17, it is considerably difficult to position the toothed parts at one end face relative to those at the other end face, without generating positional deviations therebetween. This problem must be solved by manufacturing techniques.

The first, second and third cylinders 18, 17 and 14 are fixed by being pressed into the lower and upper shafts 11C and 11A via the non-magnetic sleeves 15b and 15a. According to this method, however, positioning the cylinders 18, 17 and 14 in the axial direction cannot be achieved.

Further, in the prior art torque sensor having the above-described construction, the third cylinder 14 can be positioned in the axial direction by the gap forming member 20 interposed between the second and third cylinders 17 and 14. However, so as to bring the third and second cylinders 14 and 17 into the electromagnetically-coupled state equal to the state of the second and first cylinders 17 and 18, much troublesome adjusting work is required that the third cylinder 14 is secured to the second sleeve 15a simultaneously when the cylinder 14 is pressed against the cylinder 17 via the gap forming member 20 while the cylinder 14 is being rotated for adjustment.

SUMMARY OF THE INVENTION

This invention is intended to solve the above-described problems in the prior art, and hence, a primary object of the invention is to provide a torque sensor wherein each cylinder and/or cylindrical member can be fixed without being influenced by its manufacturing accuracy and further includes an elastic member which absorbs the rattlings of the cylinder and/or cylindrical member in the axial direction, said torque sensor being capable of generating a stable sensor output at all times without being influenced by the thermal expansion of each of its component due to temperature change.

Another objective of the invention to provide a torque sensor comprising of four cylinders each of which has toothed parts formed at one end face thereof, so that the four cylinders can be easily manufactured in the same configuration with the other end face thereof being flat. In the torque sensor of this invention, two independent magnetic circuits are formed by the two cylinders adjacent to each other among four cylinders. The magnetic circuits are stable in efficiency because the circuits are independent of each other and non subject to each others magnetic influences. Moreover, a sleeve provided with a restricting part for restricting the axial movement of the cylinders is intervened between the central second and third cylinders among four cylinders and one shaft, which is caulked and secured to the one shaft, and accordingly the cylinders can be easily positioned in the axial direction with good securing strength.

A further objective of the invention to provide a torque sensor wherein a washer, having engaging portions which are respectively to be engaged into the gaps between the toothed parts of the cylinders, is provided between the second cylinder fixed to one of the two shafts coupled by a torsion bar, and the third cylinder adjacent to the second cylinder, so that the second or third cylinder can be positioned in the rotational direction thereof with much ease.

The torque sensor is comprised of a plurality of cylinders made of magnetic material and mounted to two shafts coupled via a torsion bar, and two cylindrical members made of magnetic material and provided between the outer peripheral side of the cylinders and a cylindrical casing, with electromagnetic coupling detection coils for electromagnetically coupling the cylinders being wound in the inner peripheries of the cylindrical members. The torque sensor includes an elastic member provided at least at one side in the axial direction of the plurality of cylinders mounted to one of the shafts and/or two cylindrical members so as to fix the cylinders and/or cylindrical members in the required state in the axial direction.

As mentioned above, since the cylinders and/or two cylindrical members are fixed in the required state in the axial direction by the elastic members, these cylinders and/or cylindrical members can be prevented from rattling in the axial direction, and the thermal expansion due to the temperature change is also absorbed by the elastic members. Further, another objective of this invention is accomplished by providing the torque sensor with four magnetic cylinders each having toothed parts formed at one end face at the side of one of the shafts. The second, third and fourth cylinders are mounted to one of the two shafts coupled through a torsion bar so that the toothed parts of the first and second cylinders, and those of the third and fourth cylinders respectively confront each other, while the first cylinder is mounted to the other of the two shafts. The torque sensor is further provided with two electromagnetic coupling detection coils for electromagnetically coupling the first and second cylinders and the third and fourth cylinders respectively.

Moreover, a non-magnetic sleeve with a restricting part is interposed between the inner peripheral surface of the second and third cylinders and, the outer peripheral surface of the one shaft, thereby regulating the axial movement of the second and third cylinders. The sleeve is secured to the outer periphery of the one shaft by caulking.

In the above-described construction of the torque sensor, the fourth cylinder is fixedly inserted in the one shaft with the toothed parts thereof being directed towards the other shaft, and then the third cylinder is inserted in the one shaft with the toothed parts thereof being opposed to the toothed parts of the fourth cylinder. Further, the second cylinder is inserted into the one shaft with the toothed parts thereof being directed to the other shaft. To the other shaft, the first cylinder is secured in a manner that the toothed parts thereof are directed to the one shaft, confronting to the toothed parts of the second cylinder. The two electromagnetic coupling detection coils are so placed as to surround the first and second cylinders, and the third and fourth cylinders, respectively. Thus, the first and second cylinders constitute one magnetic circuit, and the third and fourth cylinders constitute another magnetic circuit.

In yet accomplishing another objective of this invention, the torque sensor is comprised of a third cylinder provided in one of the two shafts coupled through a torsion bar, a first cylinder mounted to the other shaft, and one or two second cylinders interposed between the first and third cylinders and mounted to the one shaft. Toothed parts are formed at the axial end faces at the confronting side of the first and second cylinders, and also at the axial end faces at the confronting side of the third and second cylinders. The torque sensor includes electromagnetic coupling detection coils, one electromagnetically coupling the first and second cylinders and the other coupling the third and second cylinders. Moreover, the torque sensor has a washer between the second and third cylinders which has engaging portions which are inserted into the gaps of the toothed parts of the cylinders.

Accordingly, in the torque sensor having the above-described construction, the second or the third cylinder can be positioned in the rotational direction by the washer between the second and third cylinders, with the engaging portions thereof being inserted into the gaps of the toothed parts of these cylinders respectively.

The above described and other features of the invention will be more fully apparent from the following detailed description with accompanying drawings.

BRIEF DESCRIPTION OF THE DRAWINGS

FIG. 23 is a longitudinal cross sectional view of the torque sensor of FIG. 22.

DESCRIPTION OF THE PREFERRED EMBODIMENTS

A torque sensor of this invention is described hereinafter according to the preferred embodiments thereof with reference to the accompanying drawings.

Figure 1:
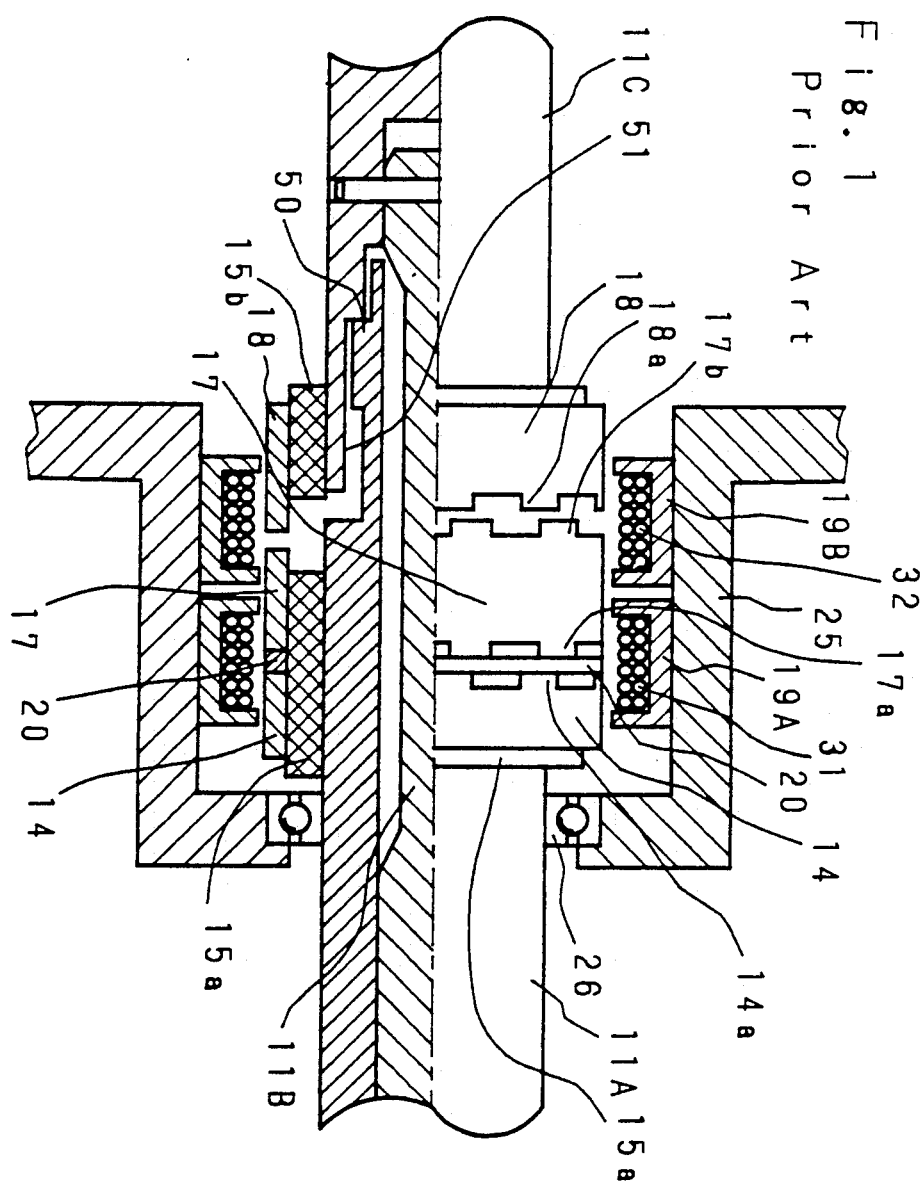
FIG. 1 is a half cross sectional view of a prior art torque sensor.
Figure 2:
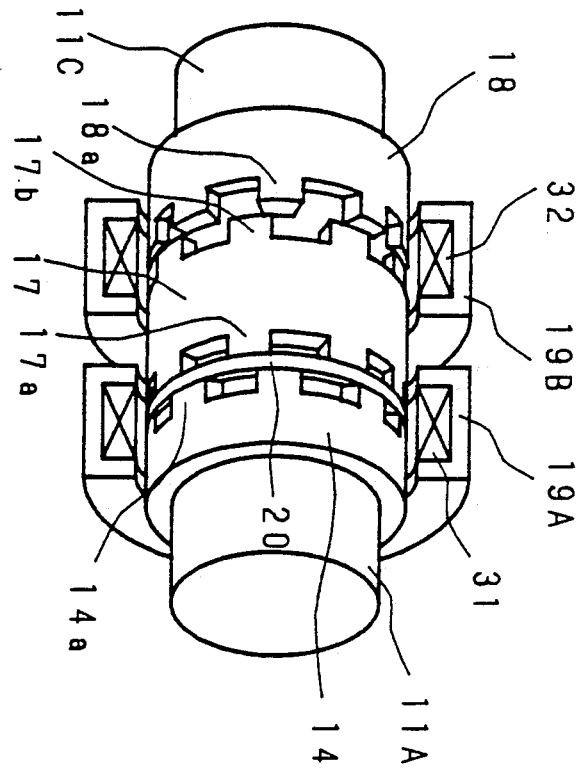
FIG. 2 is a schematic perspective view of the prior art torque sensor.
Figure 3:
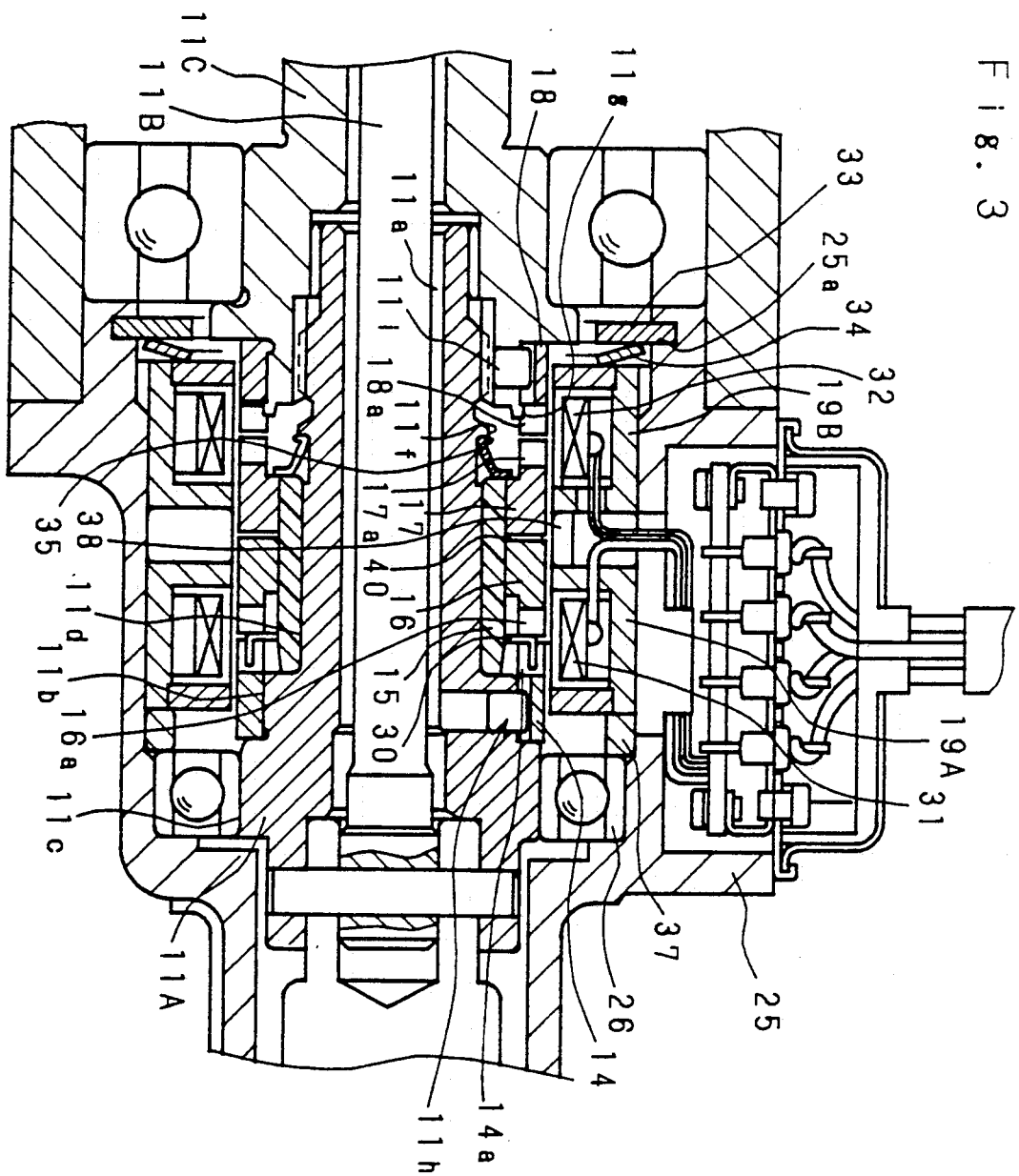
FIG. 3 is a longitudinal cross sectional view of a torque sensor according to one preferred embodiment of this invention.
Figure 4:
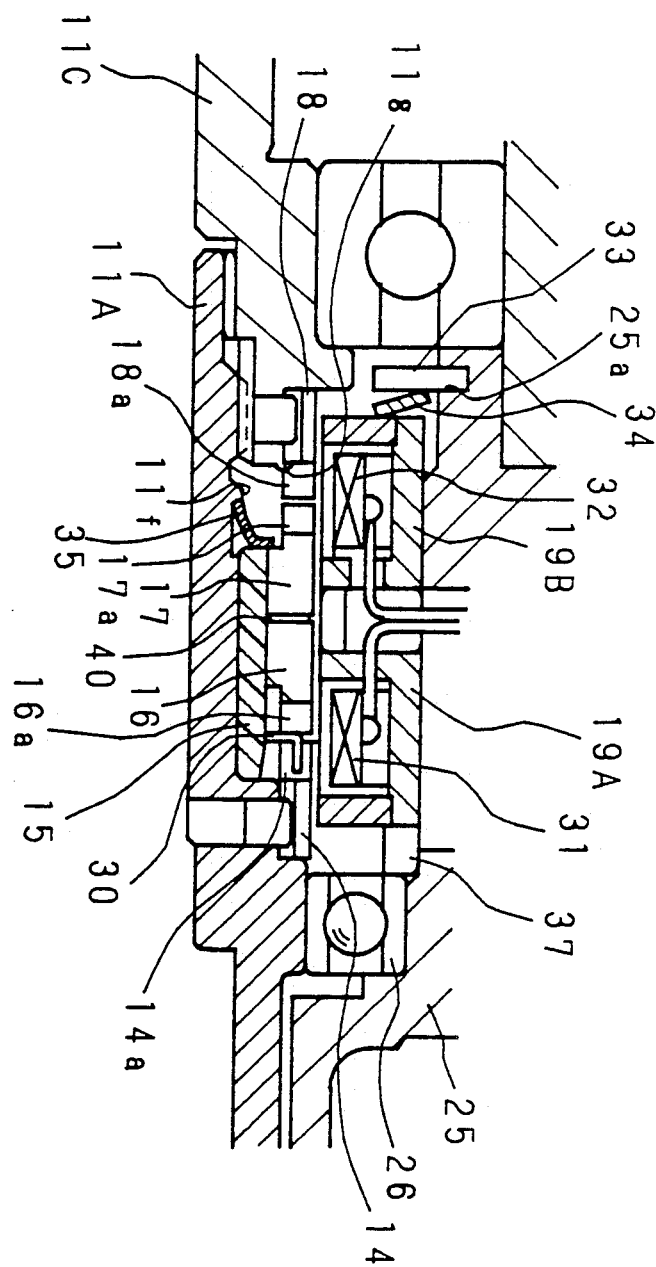
FIG. 4 is a longitudinal cross sectional view of the essential part of the torque sensor of FIG. 3.

The construction of the torque sensor of this invention is shown in the longitudinal cross sectional view of FIG. 3, with the essential parts thereof being shown in FIG. 4.

In the torque sensor of this invention, an upper shaft 11A connected to a steering wheel (not shown) is coaxially coupled to a lower shaft 11C connected to a steering system (not shown), via a torsion bar 11B. The upper shaft 11A is rotatably supported by a cylindrical casing 25 fixed to the body of an automobile (not shown) via a bearing 26.

The upper shaft 11A has an insertion hole 11a opening towards the axial direction in the center of the radial direction thereof. The torsion bar 11B is inserted through the insertion hole 11a. The outer periphery of the upper shaft 11A has a wider diameter part 11c in the upper part thereof (right side in the drawing), and a narrower diameter part 11d in the lower part thereof (left side in the drawing) through a stepped part 11b.

Figure 12:
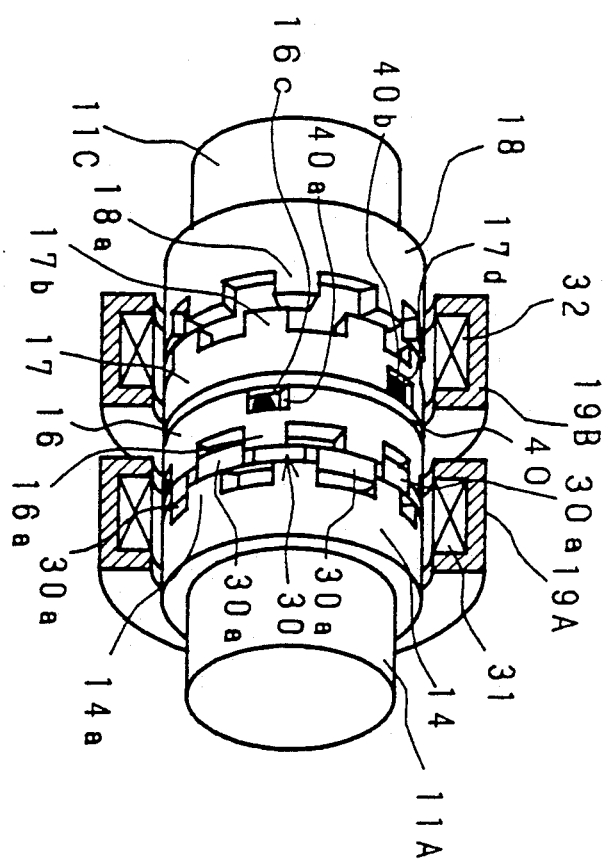
FIG. 12 is a perspective view schematically showing the state where a washer is mounted to the torque sensor.
Figure 13:
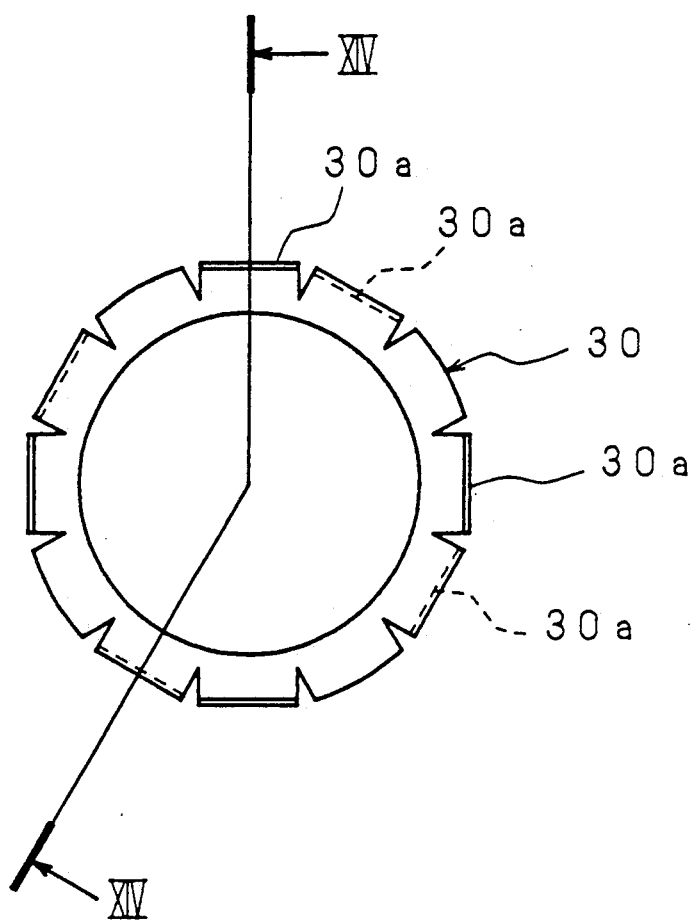
FIG. 13 is a front view of a first washer employed in the torque sensor of FIG. 12.
Figure 14:
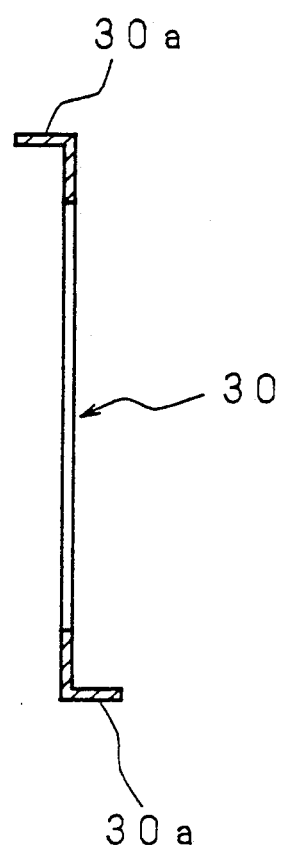
FIG. 14 is a cross section taken along the line XIV-XIV of FIG. 13.
Figure 15:
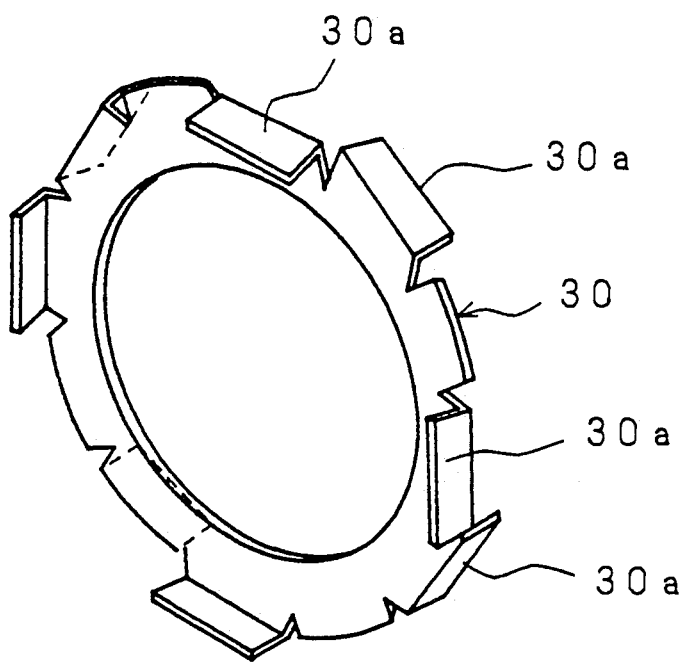
FIG. 15 is a perspective view of the first washer of FIG. 13.
Figure 16:
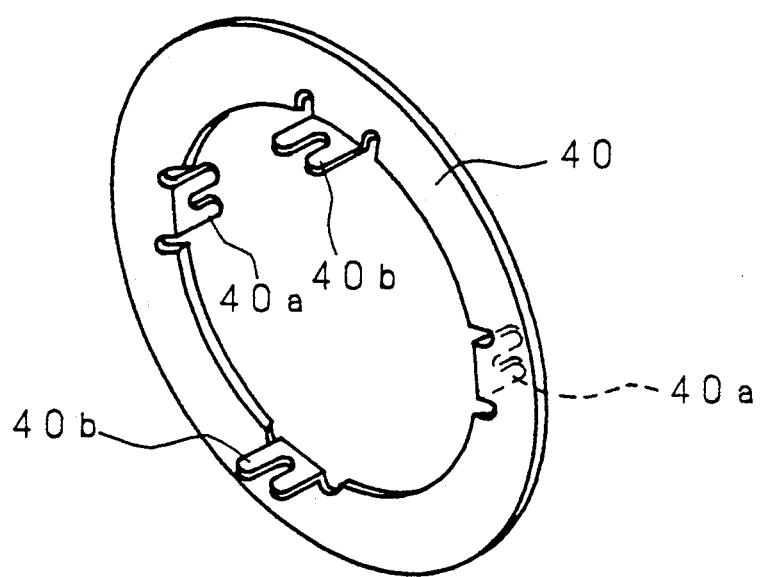
FIG. 16 is a perspective view of a second washer.

A fourth cylinder 14 made of a magnetic material is fitted in the stepped part 11b of the upper shaft 11A in such a manner that the upper end thereof is pressed in contact with the stepped wall surface of the wider diameter part 11c. The fourth cylinder 14 is in contact with the stepped wall surface to such a degree that the rotation of the upper shaft 11A is able to be transmitted to the fourth cylinder 14. Further, the fourth cylinder 14 is fixed in the rotational direction thereof since the cylinder is engaged at the inner radial portion thereof with a pin 11h mounted to the upper shaft 11A. A sleeve 15 made of a non-magnetic material is fitted in the narrow diameter part 11d in the lower part of the fourth cylinder 14 (left side in the drawing). In the outer periphery of the sleeve 15 are fitted third and second cylinders 16 and 17 made of a magnetic material having the same configuration as the fourth cylinder 14 except as to the dimension of the inner diameter. More specifically, the third and second cylinders 16 and 17, are fitted in contact with the sleeve 15 to such a degree that the rotation of the sleeve 15 subsequent to the rotation of the upper shaft 11A can be transmitted to the cylinders 16 and 17. A first and a second washer 30 and 40 respectively are of a ring shape with the narrow width and are interposed between the fourth and third cylinders 14 and 16, and between the third and second cylinders 16 and 17, as shown in FIG. 12. The washers 30 and 40 are mode of non-magnetic material, each having tongue pieces which engage with the toothed parts of each cylinder. Consequently, the cylinders 14, 16 and 17 are in the circumferential direction. The first washer 30 intervened between the fourth and third cylinders 14 and 16 has many tongue pieces 30a, 30a, ... which are respectively engaged in the gaps of toothed parts 14a and 16a (described later) of the cylinders 14 and 16, which are secured to the outer periphery of the sleeve 15. More specifically, as shown in FIGS. 13 through 15, the first washer 30 is generally ring-shaped, and the outer periphery thereof is notched and divided into 12 equal parts in accordance with the number of gaps (8) between the toothed parts 14a or 16a of the fourth or third cylinders 14, 16. The notched parts are of three types. Namely, one is bent and projected to one side, constituting engaging portions 30a having approximately the same width as that of the gap between the toothed parts 14a and 14a, with a shorter length than the depth of the gap between the toothed parts 14a and 14a. The adjacent second one is bent and projected to the other side, constituting engaging portions 30a having approximately the same width as that of the gap between the toothed parts 16a and 16a, with a shorter length than the depth of the gap between the toothed parts 16a and 16a. The third one adjacent to the second one is not provided with engaging portions. Thus the first washer 30 is provided with notched parts having engaging portions 30a, in one direction followed by another engaging portions 30a in the opposite direction, and without the engaging portions, sequentially in this order in the outer periphery thereof.

The engaging portions 30a projecting to the one side are engaged into respective gaps of the toothed parts 14a, 14a, . . . of the fourth cylinder 14, while the engaging portions 30a projecting to the other side are engaged into the gaps of the toothed parts 16a, 16a, . . . of the third cylinder 16. The toothed part 14a of the fourth cylinder 14 is displaced by 30° in the peripheral direction from the toothed part 16a of the third cylinder 16.

As described above, because of the first washer 30, provided between the fourth and third cylinders 14 and 16 and having the engaging portions 30a, 30a, . . . inserted into the respective gaps of the toothed parts 14a and 16a of the cylinders 14 and 16, the fourth and third cylinders 14 and 16 are positioned both in the axial direction and in the rotational direction.

Furthermore, as indicated in FIG. 12, the third and second cylinders 16 and 17 have key grooves 16c, 16c and 17d, 17d respectively at the confronting end surfaces at the confronting positions in the radial direction. The above-referred second washer 40 is formed with engaging portions 40a and 40a projecting to one side from the inner peripheral edge at two confronting points of the equally-divided four parts in the radial direction, and with engaging portions 40b and 40b projecting to the opposite side from the inner periphery edge at the remaining two points. Each of these engaging portions 40a, 40a, 40b and 40b has a recess notched from the outer peripheral edge towards the depth thereof at the center in the widthwise direction.

Pursuant to the above-described structure, cylinders 16 and 14 can be easily electromagnetically coupled to each other in similar manner as cylinders 18 and 17. Therefore, the three cylinders 14, 16 and 17 can be positioned in the rotational direction in a reduced time period without requiring time consuming operations for positioning the individual cylinder.

The first and second washers 30 and 40 are made of non-magnetic material, and accordingly never affect the magnetic coupling of the cylinders 14 and 16.

The end face at the side of the upper shaft of the fourth cylinder 14 is made flat and perpendicular to the center of the upper shaft 11A. The other end face at the lower shaft side of the fourth cylinder 14 has many (8 according to this embodiment), rectangular toothed parts 14a, 14a, . . . formed with an equal pitch in the peripheral direction of the cylinder. The front end of each toothed part 14a is rendered flat perpendicular to the center of the upper shaft 11A. Likewise, the end face at the upper shaft side of the third cylinder 16 and the end face at the lower shaft side of the second cylinder 17 are respectively formed with toothed parts 16a, 16a, . . . and 17a, 17a, . . . . The end face at the lower shaft side of the third cylinder 16 and the end face at the upper shaft side of the second cylinder 17 are made flat and perpendicular to the center of the upper shaft 11A. Therefore, the toothed parts 14a, 14a, . . . of the fourth cylinder 14 confront the toothed parts 16a, 16a, . . . of the third cylinder 16.

At the upper end of the lower shaft 11C a first cylinder 18 made of a magnetic material is fitted. This first cylinder 18 is of the same configuration as the fourth, third and second cylinders 14, 16 and 17 except for the size of its inner diameter. The first cylinder 18 has toothed parts 18a, 18a, . . . which are spaced at a suitable distance so as to confront toothed parts 17a, 17a , . . . of the second cylinder 17.

Cylindrical members 19A and 19B made of magnetic material are fitted inside the casing 25, and a peripheral groove is formed in each of the cylindrical members 19A and 19B. The cylindrical member 19A is positioned as to face the confronting portion of the fourth and third cylinders 14 and 16, while the cylindrical member 19B is positioned so as to face the confronting portion of the second and first cylinders 17 and 18. A first electromagnetic coupling detection coil 32 and a second electromagnetic coupling detection coil 31 are wound around in the peripheral grooves in the cylindrical members 19B and 19A respectively, so that the first and second cylinders 18 and 17 are electromagnetically coupled to each other by the first electromagnetic coupling detection coil 32, and the third and fourth cylinders 16 and 14 are electromagnetically coupled to each other by the second electromagnetic coupling detection coil 31. The electromagnetic coupling detection coils 31 and 32 are arranged to induce a voltage corresponding to the state of the electromagnetic coupling. The positions of the cylinders 14, 16 and 17, 18 are determined by obtaining the electromagnetic coupling state thereof so that the induced voltages in the first and second electromagnetic coupling detection coils 31 and 32 are equal to each other when no torque acts on the torsion bar 11B. the induced voltage due to the change in the ambient temperature can be negated if the difference of the induced voltages in the coils 31 and 32 is obtained, and the state of the electromagnetic coupling corresponding to the relative rotating amount of the cylinders 17 and 18 is detected, thereby to detect the torque applied to the torsion bar 11B.

Figure 17:
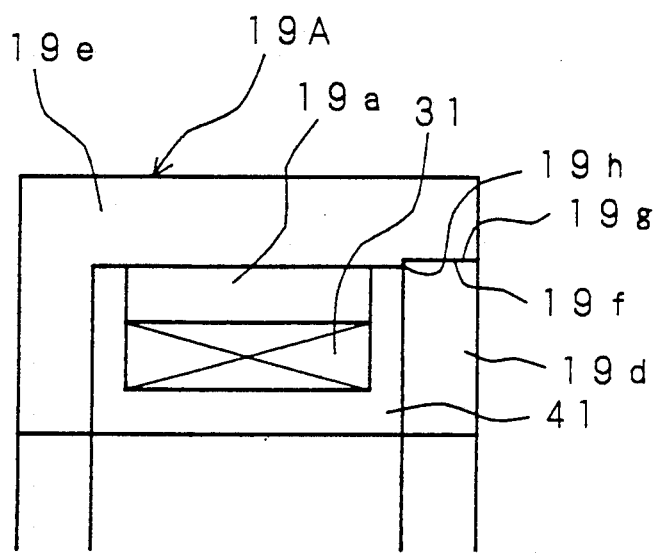
FIG. 17 is an enlarged cross sectional view of a cylindrical member.

As indicated in FIGS. 3 and 17, the cylindrical members 19A and 19B (only the right cylindrical member 19A in FIG. 3 is shown in FIG. 17) are respectively comprised of an outer wall part 19D and an L-shaped main body 19e which are separately formed from each other, and press-in surfaces 19f and 19g between the outer wall part 19d and the main body 19e. The press-in surfaces 19f and 19g and 19b to the position slightly aside to the outer peripheral side, extending from the outer peripheral end of the stepped part 19h to the outside in the same direction as the axial direction of the cylindrical members 19A and 19B and in the opposite direction to the radial direction of the cylindrical members 19A and 19B. In the state where the main body 19e is separated from the outer wall part 19d, bobbins 41 and 42 wound around with the electromagnetic coupling detection coils 31 and 32 are placed in the peripheral grooves 19a and 19b. Thereafter, the outer wall part 19d is pressed into the main body 19e in a manner such that the press-in surfaces 19f and 19g confront each other, and the cylindrical members 19A and 19B are respectively formed into one unit.

Figure 18:
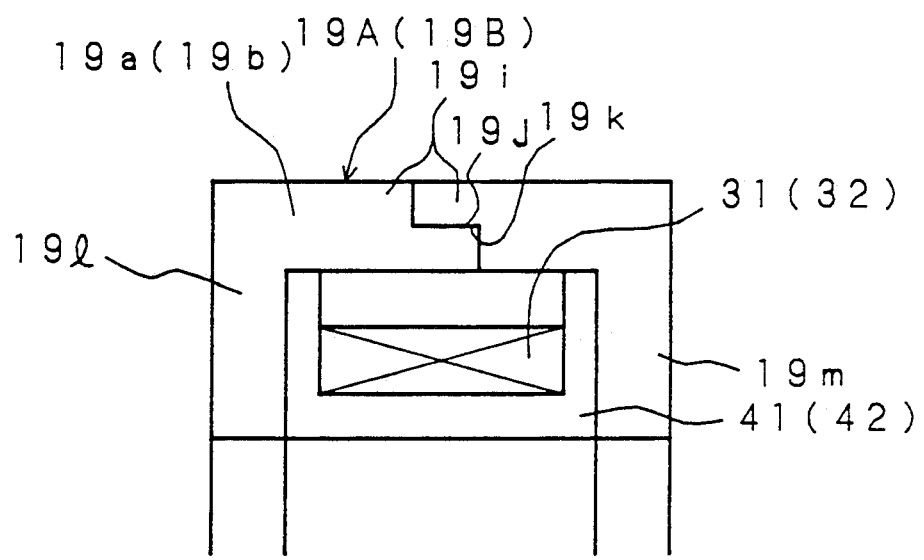
FIG. 18 is an enlarged cross sectional view of a modified example of the cylindrical member.

A modification of the cylindrical members 19A and 19B according to the invention is shown in FIG. 18, in which the cylindrical members 19A and 19B are comprised of one lateral part 19l and another lateral part 19m. Specifically, a stepped dividing part is formed in the axial center of a wall part 19i in the outer periphery of each cylinder 19A, 19B, and the surfaces parallel to the axial direction of the dividing part and opposite to the radial direction thereof are made press-in surfaces 19j and 19k. When the one lateral part 19l and the other lateral part 19m are separated, the bobbins 41 and 42 wound around with the electromagnetic coupling detection coils 31 and 32 are put in the peripheral grooves 19a and 19b of the one lateral part 19l and then, the other lateral part 19m is pressed into the one lateral part 19l in a manner so that the press-in surfaces 19j and 19k face each other. Thus, the cylindrical members 19A and 19B are formed into one unit, respectively.

As is seen from the foregoing embodiment of this invention, each of the cylindrical members 19A and 19B is constructed from two parts which are integrally formed into one unit from inserting the press-in surfaces 19f, 19g or 19j, 19k so as to confront each other. Therefore, there is no possibility a gap in the dividing part of the cylindrical member 19A or 19B resulting from the thermal deformation or thermal expansion of the components due to a change in temperature.

Figure 19:
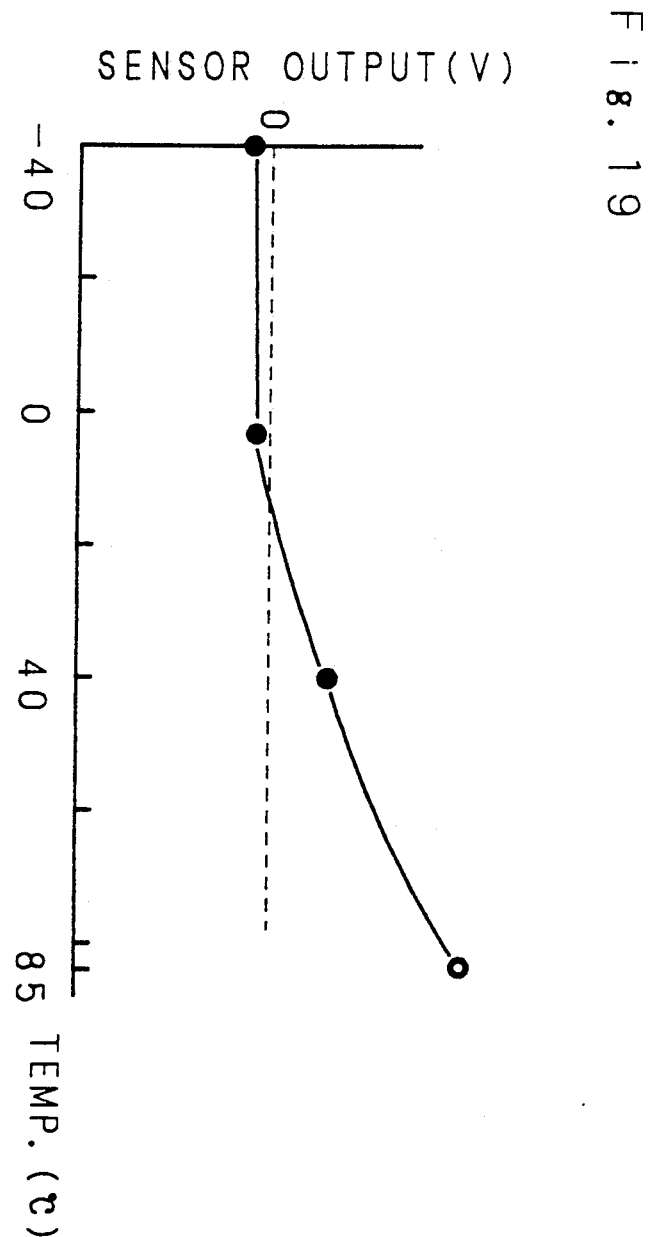
FIG. 19 is a graph showing the relation between the temperature change and the sensor output of the torque sensor of this invention employing cylindrical members placed opposite shown in FIG. 21.
Figure 20:
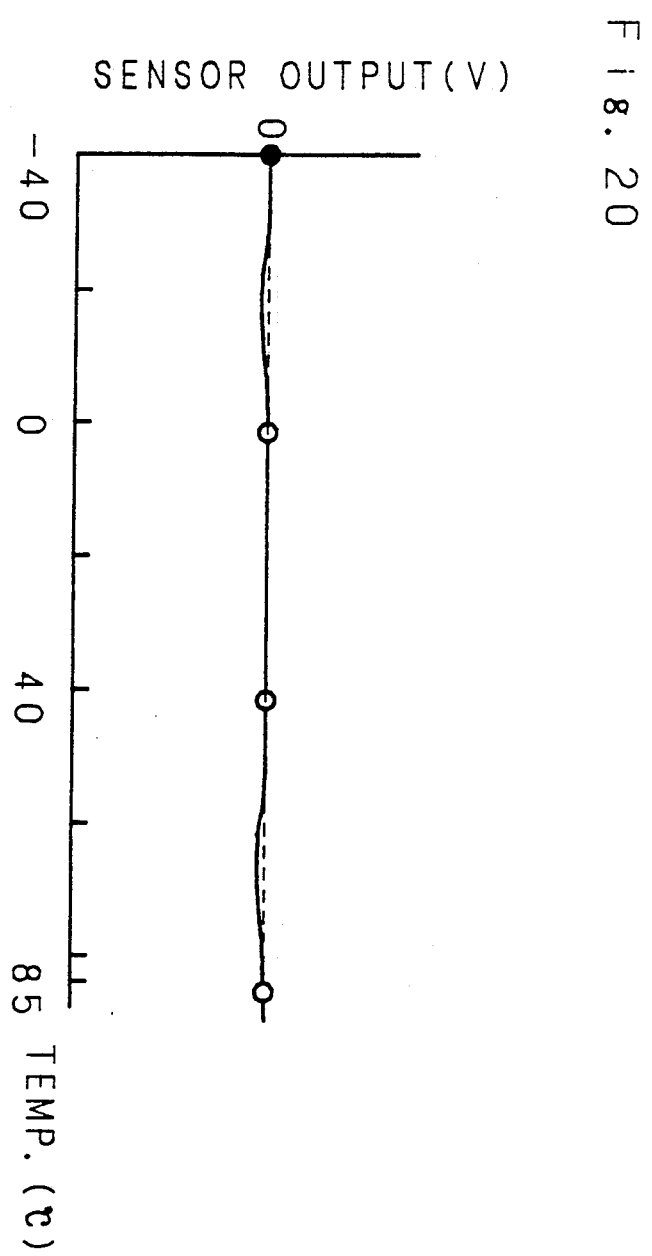
FIG. 20 is a graph showing the relation between the temperature change and the sensor output of the torque sensor of this invention employing the cylindrical member of FIG. 17.

Referring to FIGS. 19 and 20, the graphs show the relation between the temperature change and the output of a torque sensor wherein the cylindrical members 19A and 19B are butted into contact. In the graphs of FIGS. 19 and 20, the temperature is indicated in the horizontal axis, the sensor output in the vertical axis.

As the temperature rises, the sensor output of the torque sensor increases in FIG. 19. On the contrary, the sensor output of the torque sensor shown in FIG. 20 hardly changes in spite of the temperature change. Accordingly, it is clear that the above-described torque sensor in which the cylindrical members are integrally formed into one unit through the above mentioned pressing-in technique produce a stable sensor output without being influenced by the change of the ambient temperature.

Figure 5:
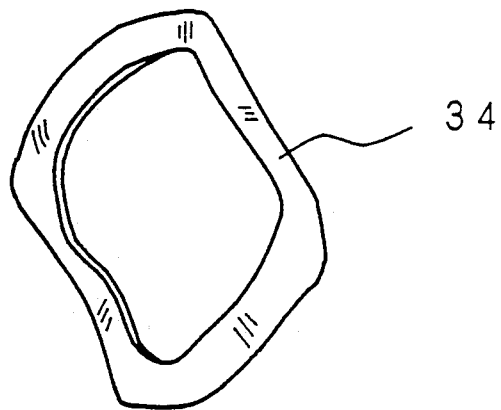
FIG. 5 is a perspective view of an elastic member made of a corrugated spring.
Figure 6:
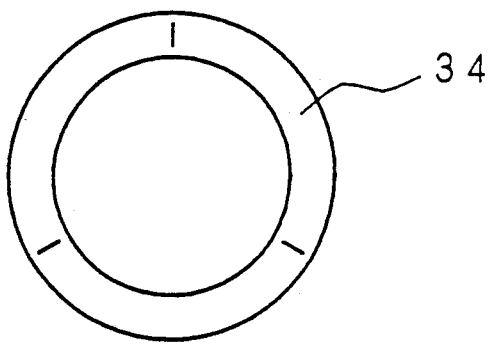
FIG. 6 is a front view of the elastic member of FIG. 5.

In the torque sensor of the above described construction, when the cylindrical members 19A and 19B are mounted, a spacer 37 is interposed between the upper magnetic cylindrical member 19A and the bearing 26 which has one end thereof pressed in contact with the upper end inside the casing 25 to secure the outer ring thereof, in a manner that the outer ring of the bearing 26 is in contact with the one end of the spacer 37. Then, a spacer 38 is placed between the upper cylindrical member 19A and the lower cylindrical member 19B and, a snap ring 33 is fitted in a peripheral groove 25a formed in the inner surface of the casing 25 below the lower cylindrical member 19B. Further, an elastic member 34 made of a corrugated spring which is in a wavelike form in the peripheral direction thereof and looped form in a plane view, as shown in FIGS. 5 and 6, is interposed between the snap ring 33 and the lower cylindrical member 19B. As a result, the two cylindrical members 19A and 19B are fixed in the urged state in the axial direction.

Figure 7:
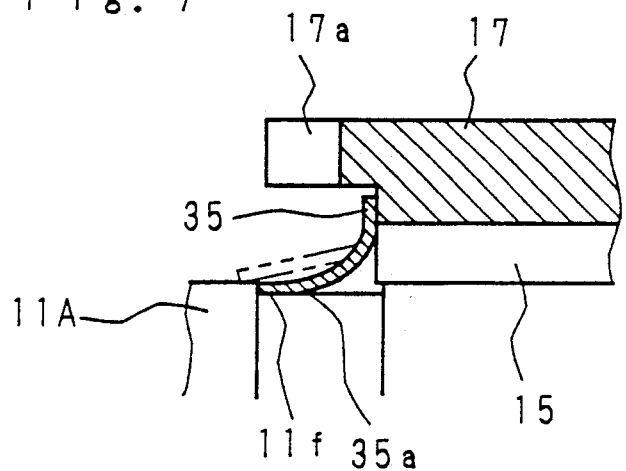
FIG. 7 is a view explanatory of the state where a second cylinder is fixed to an upper shaft by being urged by the elastic member in an axial direction.
Figure 8:
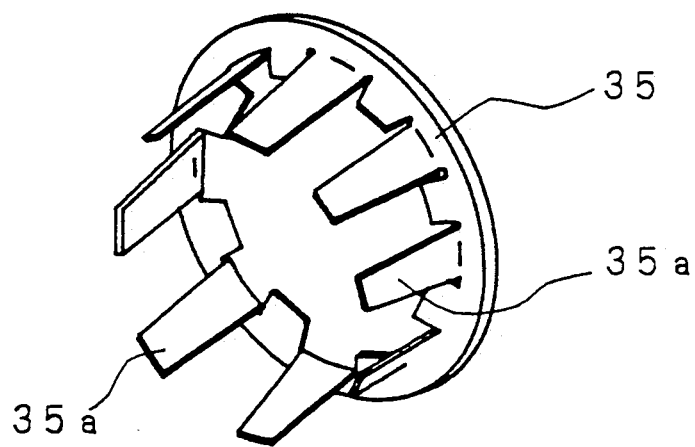
FIG. 8 is a perspective view of the elastic member of FIG. 7.

As elastic member 35 which is a ring-shaped snap ring and provided with hooks 35a, 35a, ... projecting to one side in the axial direction from the inner periphery thereof as shown in FIG. 8 is fitted in the lower end face of the second cylinder 17 among the fourth, third and second cylinders 14, 16 and 17 mounted to the upper shaft 11A through the sleeve 15, so that the hooks 35a, 35a, ... are engaged with the stepped end face of the lower stepped portion 11f of concave shape recessed in the upper shaft 11A. Accordingly, by means of the elastic member 35, the fourth, third and second cylinders 14, 16 and 17 are fixed in the urged state in the axial direction. As is seen from the enlarged view of FIG. 7, after the elastic member 35 is fitted into the upper shaft 11A, the ring-shaped portion of the elastic member 35 is brought into contact with the end face of the second cylinder 17, with the hooks 35a being pressed against the outer peripheral surface of the upper shaft 11A by the elasticity of the member 35, so that the end of each hook 35a is engaged to the stepped end face of the stepped portion 11f of the upper shaft 11A.

Figure 9:
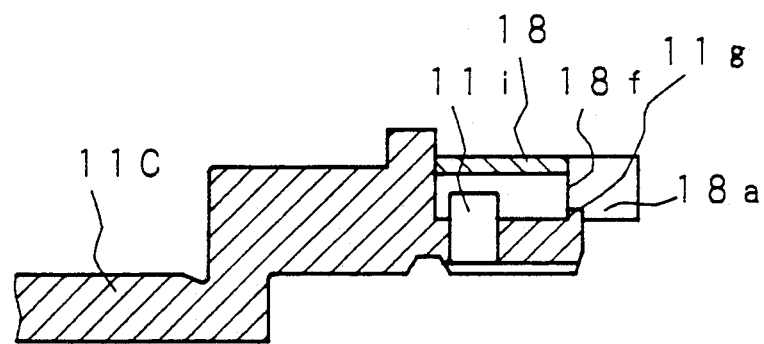
FIG. 9 is a cross sectional view explanatory of the state where a first cylinder is securely caulked to a lower shaft.
Figure 10:
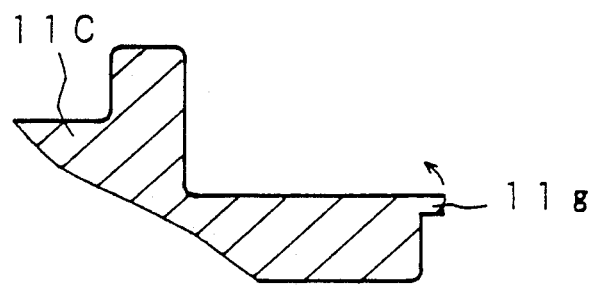
FIG. 10 is an enlarged cross sectional view of an upper part of the lower shaft of FIG. 9.
Figure 11:
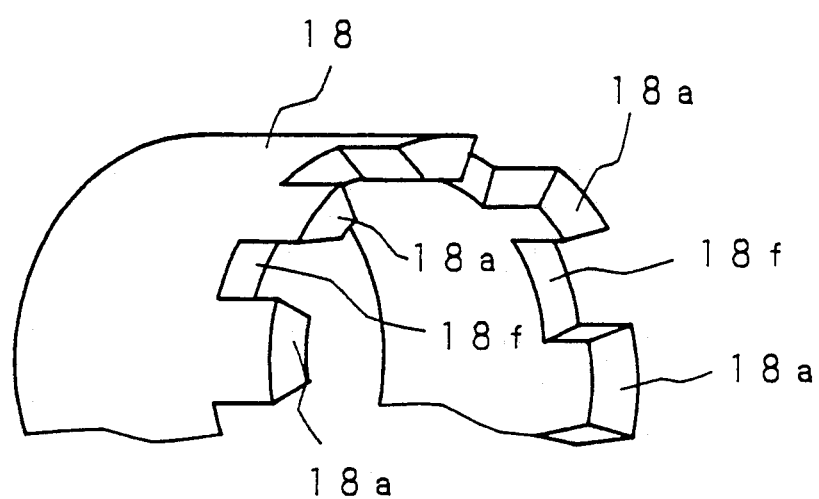
FIG. 11 is an enlarged perspective view of toothed parts of the first cylinder, partially removed.

As is understood from FIG. 10, a small protrusion 11g is formed at the upper lateral end of the lower shaft 11C, which is caulked into a gap 18f between the toothed parts 18a and 18a of the first cylinder 18 shown in FIG. 11. Accordingly, as shown in FIG. 9, the protrusion 11g is in pressed contact with the upward end face of the gap 18f between the toothed parts 18a and 18a thereby to secure the first cylinder 18 in the axial direction. It may be possible that many protrusions 11g are formed to be caulked to every gap 18f between the toothed parts 18a and 18a of the first cylinder 18, or to a part of the gaps 18f of the toothed parts 18a. Since the first cylinder 18 is fitted at the inner diameter portion thereof with a pin 11i fastened to the lower shaft 11C, it is fixed in the rotational direction.

In the above-described construction of the torque sensor of this invention, the fourth, third and second cylinders 14, 16 and 17 and the two cylindrical members 19A and 19B are securely fixed by the elastic members 35 and 34 in the urged state in the axial direction. As a result of this, the fourth, third and second cylinders 14, 16 and 17 and, the cylindrical members 19A and 19B can be prevented from rattling in the axial direction since the elastic members 35 and 34 absorb the rattlings of these components. Moreover, the thermal expansion of each of these component resulting from the change in the ambient temperature can be also absorbed by the elastic members 35 and 34. Additionally, since the fourth, third and second cylinders 14, 16 and 17 and the cylindrical members 19A and 19B are not fixed to the upper shaft 11A and the casing 25 by the pressing-in method, stress as would be caused by the pressing-in operation, does not occur. Consequently, for the above-described reasons, the torque sensor of this invention can generate a stable sensor output at all times.

According to the embodiments of this invention, the protrusion 11g formed at the upper lateral end of the lower shaft 11C is caulked and fitted in the gap 18f of the toothed parts 18a and 18a of the first cylinder 18 to be pressed in contact with the upward end face of the cylinder 18, in other words, the first cylinder 18 can be positively and securely positioned in this simple manner by utilizing the gap 18f of the toothed parts 18a and 18a, resulting in no change in the sensor output due to its heat or the like.

Moreover, the fourth, third and second cylinders 14, 16 and 17 are secured in the urged state in the axial direction by the elastic member, namely, the ring-shaped snap ring having a plurality of hooks 35a, 35a . . . projecting to one side in the axial direction. Therefore, it becomes advantageously easy to secure the cylinders since it is enough to press the snap ring in contact with the lower end face of the second cylinder 17, while pressing the hooks 35a against the upper shaft 11A to engage the end of each hook to the stepped end face of the stepped portion 11f of the upper shaft 11A.

The ring-shaped snap ring which has many hooks 35a, 35a, . . . projecting to the one side in the axial direction of the cylinder is employed for the elastic member 35 so as to secure the fourth, third and second cylinders 14, 16 and 17 in the urged state, as described hereinabove in the present invention. However, the elastic member 35 is not limited to this kind of a snap ring, but may be a corrugated spring which is intervened between a snap ring mounted to the upper shaft 11A and the second cylinder 17 so as to secure the fourth, third and second cylinder 14, 16 and 17 in the urged state, or other shapes of elastic members 34 and 35 may be employed.

Further, it should be noted that the fourth, third and second cylinders 14, 16 and 17 and, the two cylindrical members 19A and 19B are secured to the upper shaft 11A and the casing 25 in the urged state in the axial direction by the elastic members 35 and 34, respectively. The present invention is not limited to the foregoing embodiments as only the fourth, third and second cylinders 14, 16 and 17 or, only the two cylindrical members 19A and 19B may be secured in the urged state in the axial direction by the elastic member 35 or 34.

It is also possible that the fourth, third and second cylinders 14, 16 and 17 and, the two cylindrical members 19A and 19B be secured in the urged state in the axial direction by the elastic member 35 or 34.

It is also possible that the fourth, third and second cylinders 14, 16 and 17 and, the two cylindrical members 19A and 19B be secured in the urged state at the opposite sides thereof in the axial direction by the elastic members 35 and 34, respectively.

As has been fully described hereinabove, according to this invention, a plurality of cylinders and/or two cylindrical members are secured in the urged state in the axial direction by the elastic members. Therefore, the plurality of the cylinders and/or two cylindrical members can be prevented from rattling in the axial direction because the elastic members absorb the rattlings. Moreover, since the elastic members also absorb the thermal expansion in each component resulting from the change in the temperature, a stable sensor output can be obtained at all times by the torque sensor of this invention. Further, the plurality of cylinders and the two cylindrical members are not secured to one of the shafts and the casing by the pressing-in method, and accordingly no stress is generated in the shafts or the casing of the torque sensor.

Figure 21:
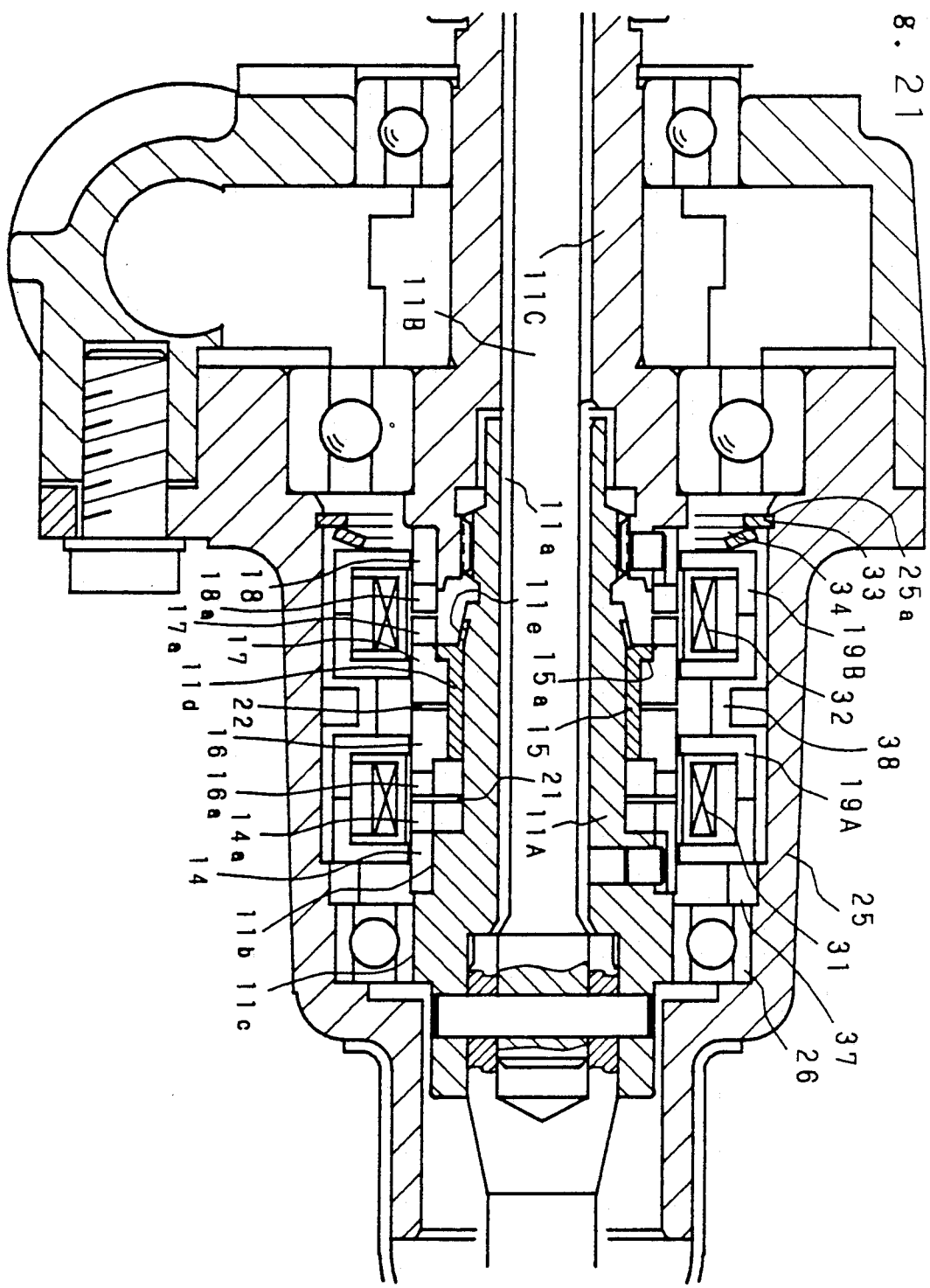
FIG. 21 is a longitudinal cross sectional view of the construction of a torque sensor according to another embodiment of this invention.

Another embodiment of this invention is described hereinafter. FIG. 21 is a longitudinal cross sectional view showing the construction of another embodiment of a torque sensor. In the torque sensor of FIG. 21, the upper shaft 11A is provided with the insertion hole 11a through which the torsion bar is inserted. The insertion hole 11a opening is in the axial direction at the center of the radial direction of the upper shaft 11A. The outer periphery of the insertion hole 11a is formed into the wider diameter part 11c in the upper side thereof (right side in the drawing) and the narrower diameter part 11d in the lower side thereof (left side in the drawing) through the stepped part 11b.

To this stepped part 11b of the upper shaft 11A, the fourth cylinder 14 made of a magnetic material is pressed and exteriorly fitted in the state that the upper end (right end in the drawing) thereof is in contact with the stepped wall surface of the wider diameter part 11c. Further, the sleeve 15 is exteriorly fitted in the narrower diameter part 11d in the lower part (left side in the drawing) of the insertion hole 11a. The non-magnetic sleeve 15 is caulked at the lower end thereof to a small diameter par 11e of tapered shape provided in the narrower diameter part 11d, and is provided at the one end thereof with a restricting part 15a for resisting movement which is projected outwards. The magnetic third and second cylinders 16 and 17 which have the same configuration as the fourth cylinder 14 except for the size of the inner diameter are fitted in the outer periphery of the sleeve 15. It is to be noted here that the inner diameter of each of the cylinders 16 and 17 may possibly be the same as that of the fourth cylinder 14, and in such a case, all of the cylinders 14, 16 and 17 have the same configuration. Ring-shaped gap forming members 21 and 22 of a narrow width are placed between the fourth and third cylinders 14 and 16, and the third and second cylinders 16 and 17, respectively. The gap forming members 21 and 22 are non-magnetic.

The end face at the side of the upper shaft of the fourth cylinder 14 is formed flat perpendicular to the center of the upper shaft 11A, whereas, the end face at the side of the lower shaft thereof is provided with many rectangular toothed parts 14a, 14a, . . . which are spaced at an equal pitch from each other in the peripheral direction of the cylinder. Each front end face of these toothed parts 14a, 14a, . . . is perpendicular to the center of the upper shaft 11A. Similarly, the end face at the side of the upper shaft of the third cylinder 16 and the end face at the side of the lower shaft of the second cylinder 17 are respectively formed with toothed parts 16a, 16a, . . . and, 17a, 17a, . . . . The end face at the lower shaft side of the third cylinder 16 and the end face at the upper shaft side of the second cylinder 17 are respectively perpendicular to the center of the upper shaft 11A. Therefore, the toothed parts 14a, 14a, . . . of the fourth cylinder 14 confront the toothed parts 16a, 16a, . . . of the third cylinder 16.

The magnetic first cylinder 18 is fixedly fitted outside in the upper end of the lower shaft 11C. The cylinder 18 has the same configuration as the above fourth, third and second cylinders 14, 16 and 17 except for the size of the inner diameter, with toothed parts 18a, 18a thereof being spaced at a suitable distance from the toothed parts 17a, 17a, . . . of the second cylinder 71.

Inside the casing 25 are fitted magnetic cylindrical members 19A and 19B, each of which is provided with a peripheral groove. The cylindrical member 19A is positioned so as to face to the confronting position of the fourth and third cylinders 14 and 16 at the upper side, and the other cylindrical member 19B is so provided as to face the confronting position of the second and first cylinders 17 and 18 at the lower side. Moreover, in the peripheral grooves of the cylindrical members 19B and 19A, a first electromagnetic coupling detection coil 32 and a second electromagnetic coupling detection coil 31 are wound around, respectively, so that the first and second cylinders 18 and 17 are electromagnetically coupled to each other by the first electromagnetic coupling detection coil 32, with the third and fourth cylinders 16 and 14 being electromagnetically coupled to each other by the second electromagnetic coupling detection coil 31. Since the third and second cylinders 16 and 17 are separated from each other, the two magnetic circuits work completely independently, of each other and to avoid magnetic influences therebetween.

Hereinbelow, the construction of the torque sensor is described.

The toothed parts 14a of the fourth cylinder 14 are inserted towards the lower shaft 11C which is secured to the stepped part 11b of the upper shaft 11A. Then, after the gap forming member 21 is inserted in the upper shaft 11A, the sleeve 15, in the outer periphery of which the third and second cylinders 16 and 17, and the gap forming member 22 interposed between these cylinders 16 and 17 are fitted, is fitted outside of the narrower diameter part 11d of the upper shaft 11A. The lower end of the sleeve 15 is caulked and engaged to the small diameter part 11e of tapered shape. Thus, the sleeve 15 is securely fitted outside of the upper shaft 11A. At this time, the axial movement of the third and second cylinders 16 and 17 is regulated by the projecting restricting part 15a provided with the sleeve 15. The first cylinder 18 is fixed to the upper end of the lower shaft 11C. In the above construction, it is so arranged that the toothed parts 14a and 16a of the fourth and third cylinders 14 and 16 confront each other, and the toothed parts 17a and 18a of the second and first cylinders 17 and 18 confront each other.

While mounting the cylindrical members 19A and 19B, the spacer 37 is intervened between the magnetic cylindrical member 19A at the upper side and the bearing 26 one end of which is in contact with the upper end inside the casing 25 to secure the outer ring thereof. The one end of the spacer 37 is in contact with the outer ring of the bearing 26. Moreover, the spacer 38 is interposed between the upper and lower cylindrical members 19A and 19B. The snap ring 33 is fitted in the peripheral groove 25a formed in the inner surface of the casing 25 below the lower cylindrical member 19B. Since the elastic member 34 made of a corrugated spring which is corrugated in the peripheral direction and is the looped form in a plane view as shown in FIGS. 5 and 6 is intervened between the snap ring 33 and the lower cylindrical member 19B, the two cylindrical members 19A and 19B are fixedly secured in the urged state in the axial direction.

A still further embodiment of this invention is explained hereinbelow.

Figure 22:
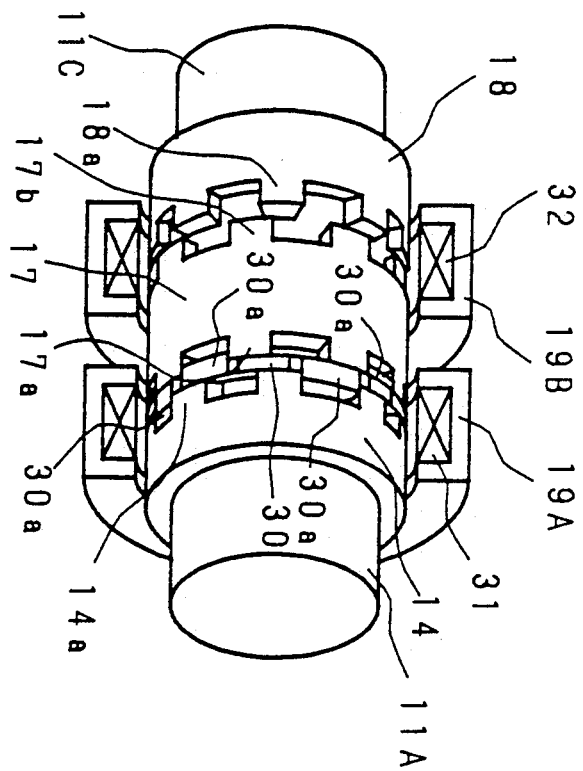
FIG. 22 is a schematic perspective view of the essential part of a torque sensor according to a further embodiment of this invention.

FIGS. 23 and 22 are respectively a longitudinal cross sectional view showing the construction of a torque sensor of the further embodiment and a schematic perspective view of the essential part thereof. Although the torque sensor in each of the foregoing two embodiments has four cylinders, the second and third cylinders 17 and 16 are integrally formed into one cylinder according to this further embodiment. In other words, the torque sensor of this embodiment has three cylinders. Moreover, a sleeve 15a is positioned in the axial direction by the elastic member 35. Further, positioning of the second and third cylinders 17 and 14 in the axial and rotational directions is achieved by the washer 30. Since the other structure is almost same as that of the foregoing embodiments, the detailed description thereof will be omitted here.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A torque sensor comprising:
a pair of shafts for rotating about a longitudinal axis,
a torsion bar, oriented along said axis, for coupling said shafts,
a plurality of cylinders made of magnetic substance which are mounted to said shafts,
at least one cylindrical member having a periphery and sides made of magnetic substance, which is positioned beyond the outer periphery of said cylinders,
at least one electromagnetic coupling detection coil being wound in the inner periphery of said cylindrical member for electromagnetically coupling said plurality of cylinders, and
at least one elastic member positioned in contact with at least one side of said at least one cylindrical member and/or said plurality of cylinders mounted to one of said shafts, so that said cylindrical member and/or cylinders are fixed in the urged state in the axial direction thereof.

2. A torque sensor as set forth in claim 1, wherein each of said plurality of cylinders has rectangular waveform toothed parts formed at one end face thereof in a manner that said toothed parts are opposed to those of the adjacent cylinder,
at least one cylinder is mounted to one of said shafts, and another cylinder is mounted to the other of said shafts, and
each of said at least one electromagnetic coupling detection coil is so provided as to be electromagnetically coupled to said cylinders.

3. A torque sensor as set forth in claim 2, further comprising a sleeve made of non-magnetic substance which has a restricting part for restricting the movement of said one cylinder in the axial direction, and is interposed between the inner peripheral surface of said one cylinder and the outer peripheral surface of said one of the shafts.

4. A torque sensor as set forth in claim 3, wherein said sleeve is fixedly engaged to the outer periphery of said one of the shafts by caulking.

5. A torque sensor as set forth in claim 1, wherein the number of said plurality of cylinders is four, each having rectangular wave-form toothed parts formed at one end face thereof so that the toothed parts of the first and second cylinders, and those of the third and fourth cylinders confront each other respectively,
said second, third and fourth cylinders are mounted to one of said shafts, and said first cylinder is mounted to the other of said shafts, and
wherein the number of said at least one electromagnetic coupling detection coil is two, which are provided so that said first and second cylinders and, said third and fourth cylinders are electromagnetically coupled.

6. A torque sensor as set forth in claim 5, further comprising a washer provided between said third and fourth cylinders and having engaging portions which are engaged into each gap of toothed parts of the cylinders.

7. A torque sensor as set forth in claim 1, wherein the number of said plurality of cylinders is three, each of a first and third cylinder having rectangular wave-form toothed parts formed at one side thereof and a second cylinder having rectangular wave-form toothed parts formed at both sides thereof so that the toothed parts of the first cylinder and those at one side of the second cylinder confront each other and, those at another side of the second cylinder and those of the third cylinder confront each other,
said second and third cylinders are mounted to one of said shafts and said first cylinder is mounted to the other of said shafts, and
wherein the number of said at least one electromagnetic coupling detection coil is two, which are positioned such that said first cylinder and the one side of said second cylinder, and the other side of said second cylinder and said third cylinder are electromagnetically coupled, respectively.

8. A torque sensor as set forth in claim 7, further comprising a washer provided between said second and third cylinders and having engaging portions to be engaged into each gap of toothed parts of the cylinders.

9. A torque sensor as set forth in claim 1, wherein said cylindrical member is formed from two parts, each part has a press-in surface confronting each other part in the radial direction.

* * * * *